United States Patent [19]
Herrick, IV

[11] Patent Number: 5,855,165
[45] Date of Patent: *Jan. 5, 1999

[54] FOOD BREADING APPARATUS

[75] Inventor: Harold Herrick, IV, Highland Village, Tex.

[73] Assignee: Dallas A.C. Horn & Co., Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 895,471

[22] Filed: Jul. 16, 1997

Related U.S. Application Data

[63] Continuation-in-part of Ser. No. 752,209, Nov. 19, 1996, Pat. No. 5,664,489.

[51] Int. Cl.$^6$ .............................. A23L 1/22; A47J 44/00; B05B 5/00; B05C 19/00
[52] U.S. Cl. ............................ 99/494; 99/450.1; 118/19; 118/23; 118/312; 366/233; 366/234
[58] Field of Search ............................. 99/494, 516, 534, 99/535, 450.1, 475; 118/13, 16, 17, 19, 20, 23, 24, 75, 308, 309, 312, 502, 418, 608; 209/288; 241/86, 88.4, 186.35, 191; 366/232–234, 221; 426/518, 523; 198/513, 669, 676

[56] References Cited

U.S. PATENT DOCUMENTS

| | | | |
|---|---|---|---|
| 3,648,648 | 3/1972 | Johnson et al. | 118/19 |
| 3,735,726 | 5/1973 | Butler | 118/24 |
| 3,739,743 | 6/1973 | McKee | 118/19 |
| 3,885,519 | 5/1975 | Orlowski | 118/16 |
| 4,458,586 | 7/1984 | Reed | 99/494 |
| 4,936,248 | 6/1990 | Miller | 118/312 X |
| 5,052,330 | 10/1991 | Stacy | 99/450.1 X |
| 5,133,278 | 7/1992 | Anderes | 118/19 |
| 5,195,454 | 3/1993 | Wadell | 118/312 X |
| 5,226,354 | 7/1993 | Stewart | 366/234 X |
| 5,236,502 | 8/1993 | Wadell | 99/494 X |
| 5,265,525 | 11/1993 | Stewart | 99/494 |
| 5,284,514 | 2/1994 | Griffiths | 118/23 |
| 5,514,399 | 5/1996 | Cordera et al. | 99/494 |

OTHER PUBLICATIONS

Exhibits A1–A7, inclusive, illustrate a food breading device sold by Stein, Inc., of Sandusky, Ohio, Model #DB4. This device is stipulated as prior art by applicant, undated.
Exhibit B is a seasoning tumbler used commercially by Frito Lay and stipulated as prior art by applicant, undated.

*Primary Examiner*—Timothy F. Simone
*Attorney, Agent, or Firm*—Michael A. O'Neil

[57] ABSTRACT

A food breading apparatus for breading food components with a breading mixture includes a breading drum rotatable about its longitudinal axis wherein the longitudinal axis is inclined from horizontal. The drum includes an inlet opening located in an upper end, an outlet opening located in a lower end, and a plurality of perforations located proximal to the lower end and through a sidewall of the drum. The perforations are sized to allow surplus breading mixture and lumps of breading mixture to pass therethrough but to retain the breaded food product in the rotating breading drum. An inlet conveyor provides food products to be breaded to the inlet opening of the breading drum. A recirculating breading mixture conveyor provides the breading mixture to the inlet opening. A takeout conveyor moves the breaded food products from the outlet opening of the breading drum. A lump removal conveyor is positioned below the plurality of perforations in the sidewall of the breading drum. The lump removal conveyor includes a plurality of openings sized to allow passage of surplus powdered breading mixture therethrough but to retain the lumps of breading mixture for transport to a catch pan. A shaker shoe mechanism raises a portion of the lump removal conveyor as it carries lumps and breading to facilitate moving powdered breading mixture through the openings of the lump removal conveyor and to facilitate recycling a maximum amount of the breading mixture. A surge hopper and conveyor positioned below the lump removal conveyor collects surplus breading mixture passing through the openings in the lump removal conveyor and transports surplus breading mixture to the recirculation conveyor wherein the cycle begins again.

19 Claims, 8 Drawing Sheets

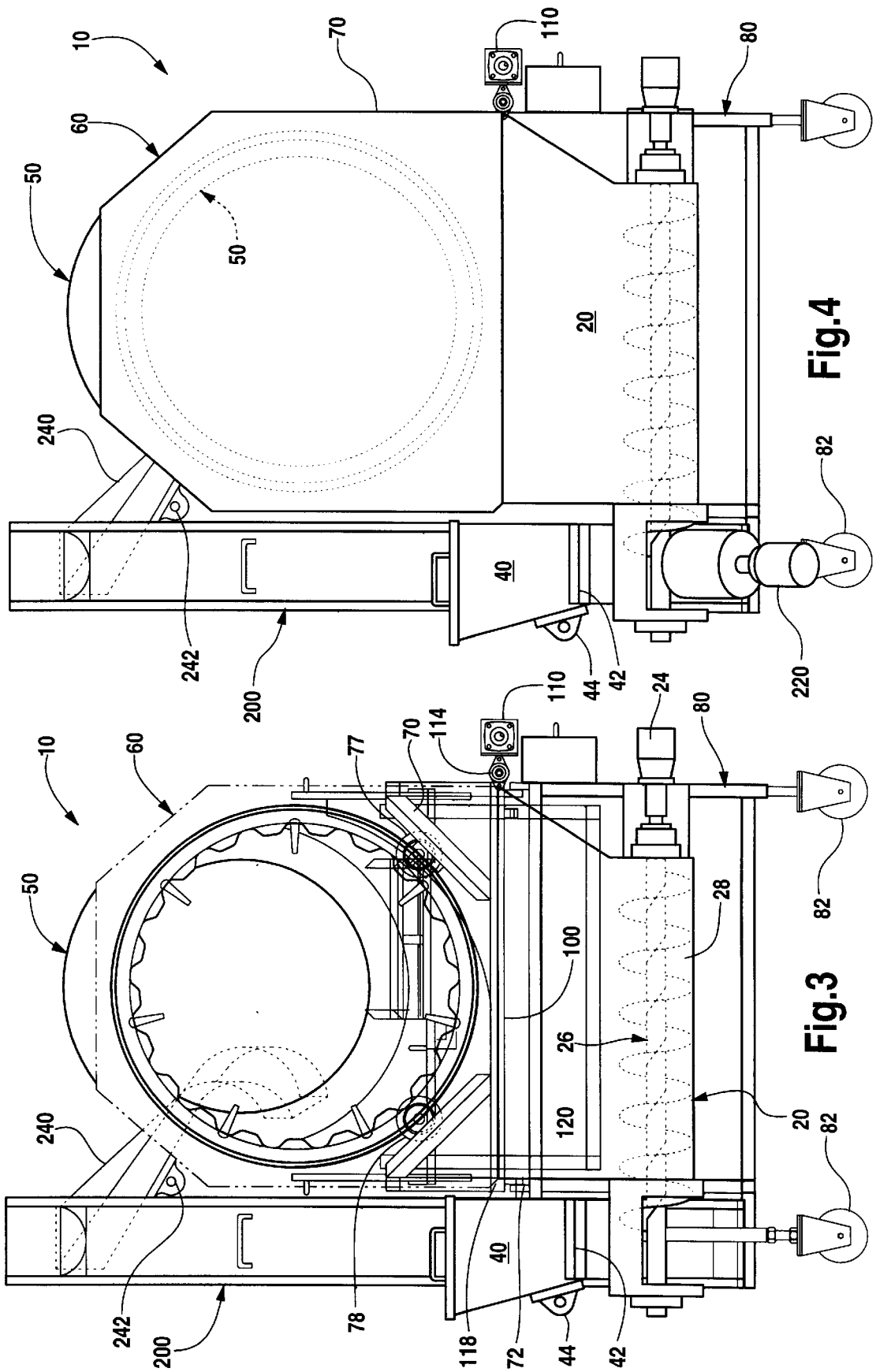

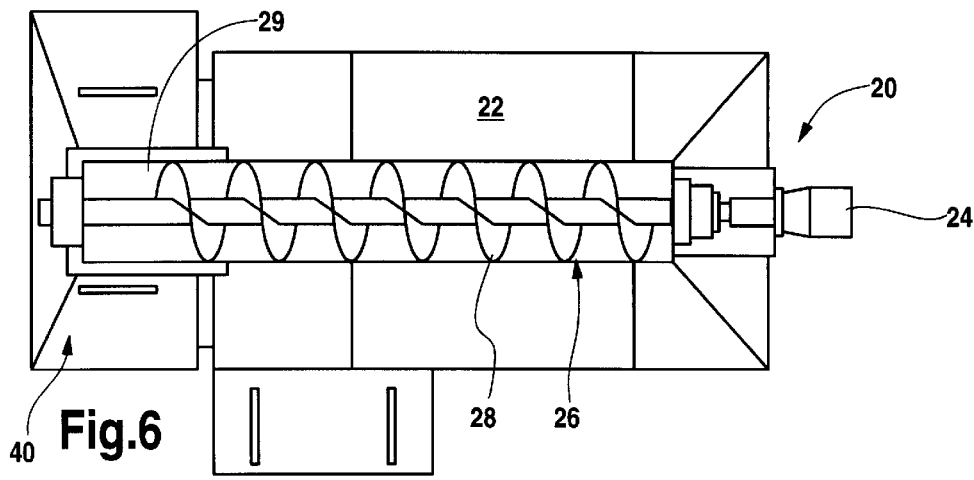
Fig.6
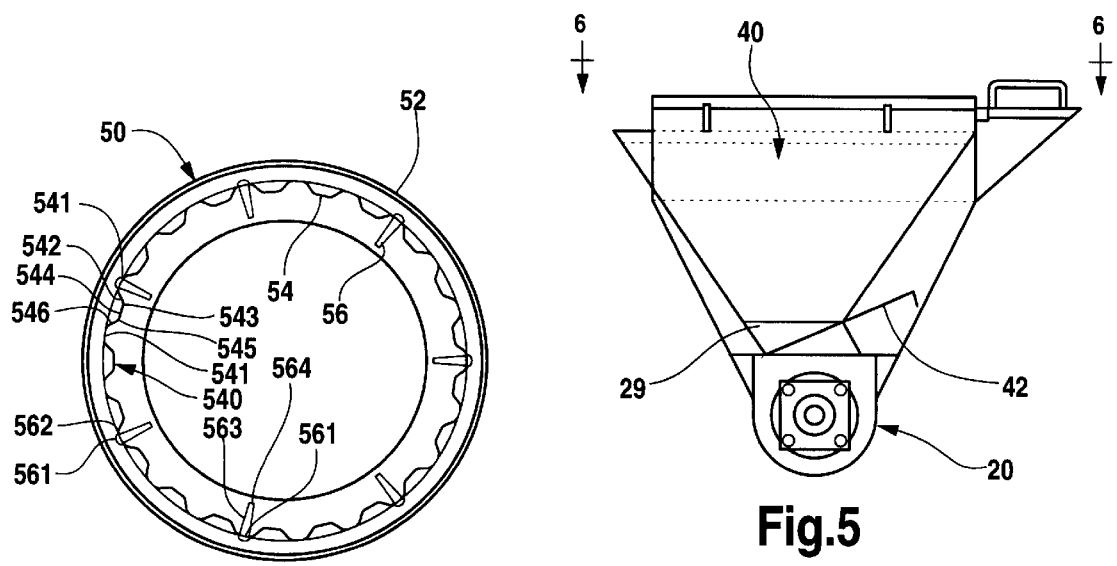
Fig.8
Fig.5
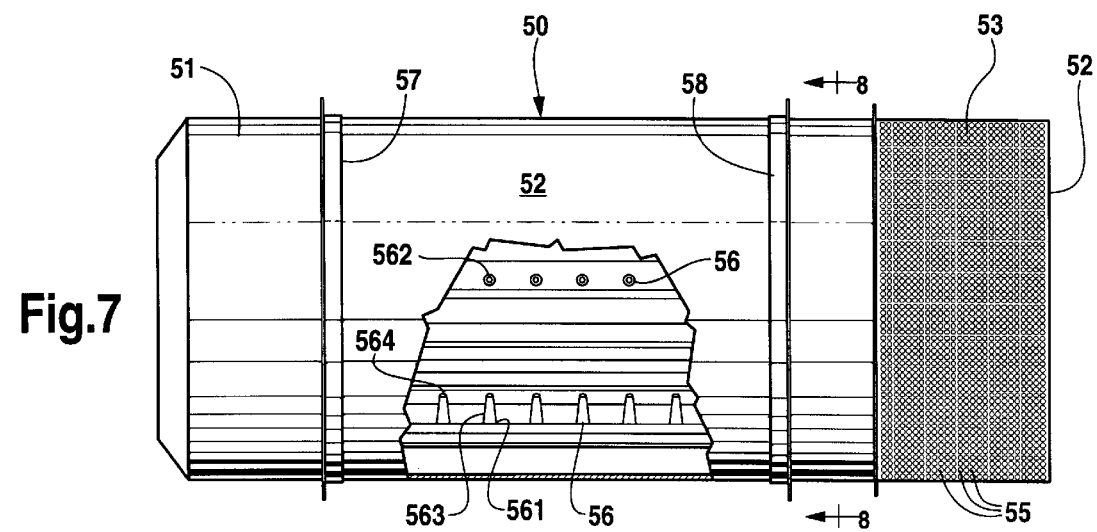
Fig.7

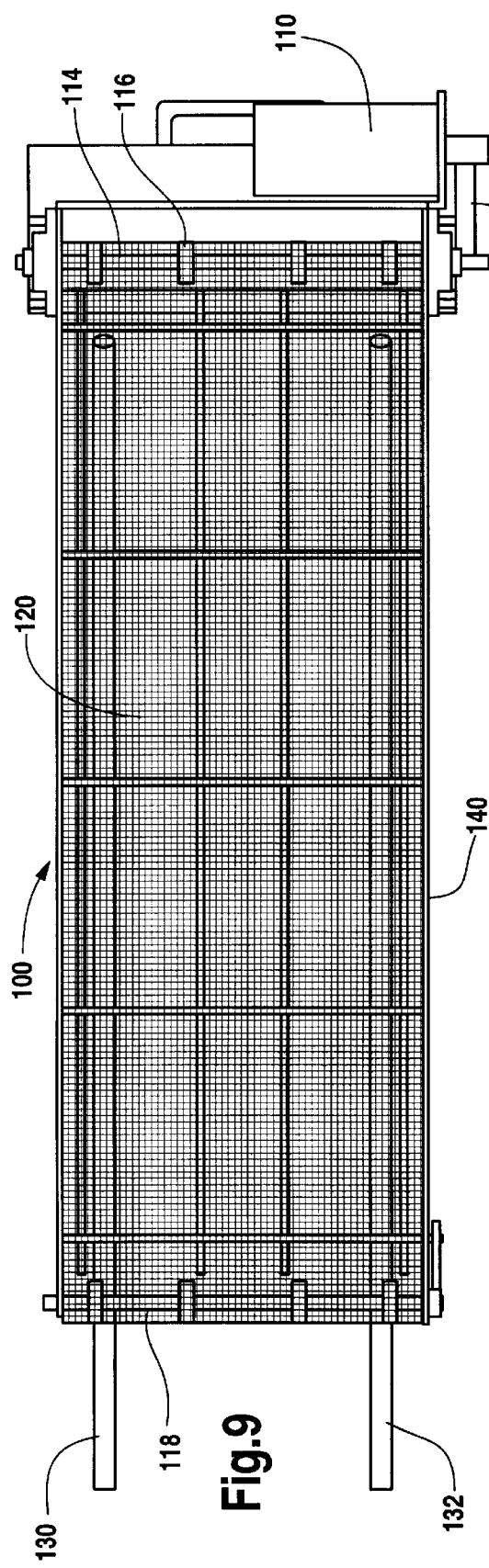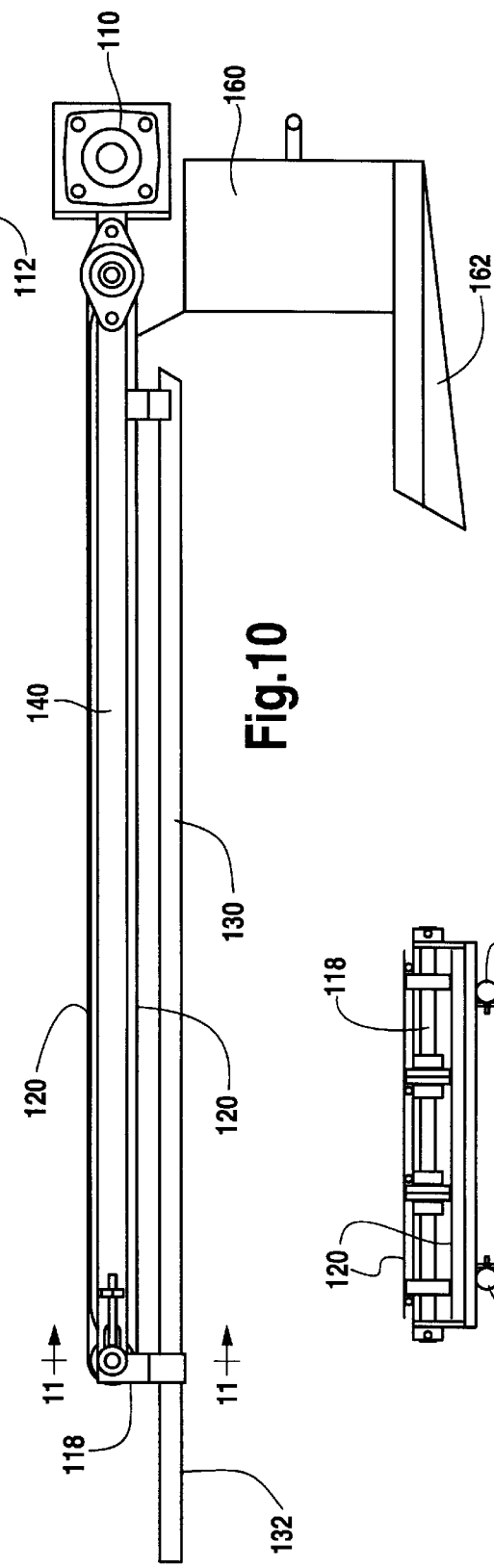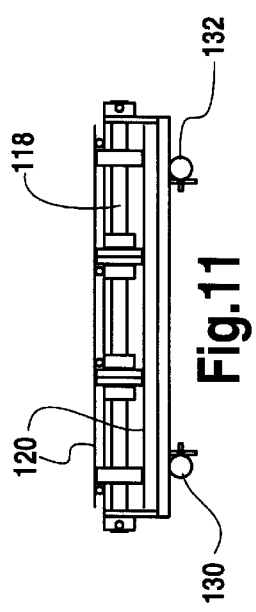

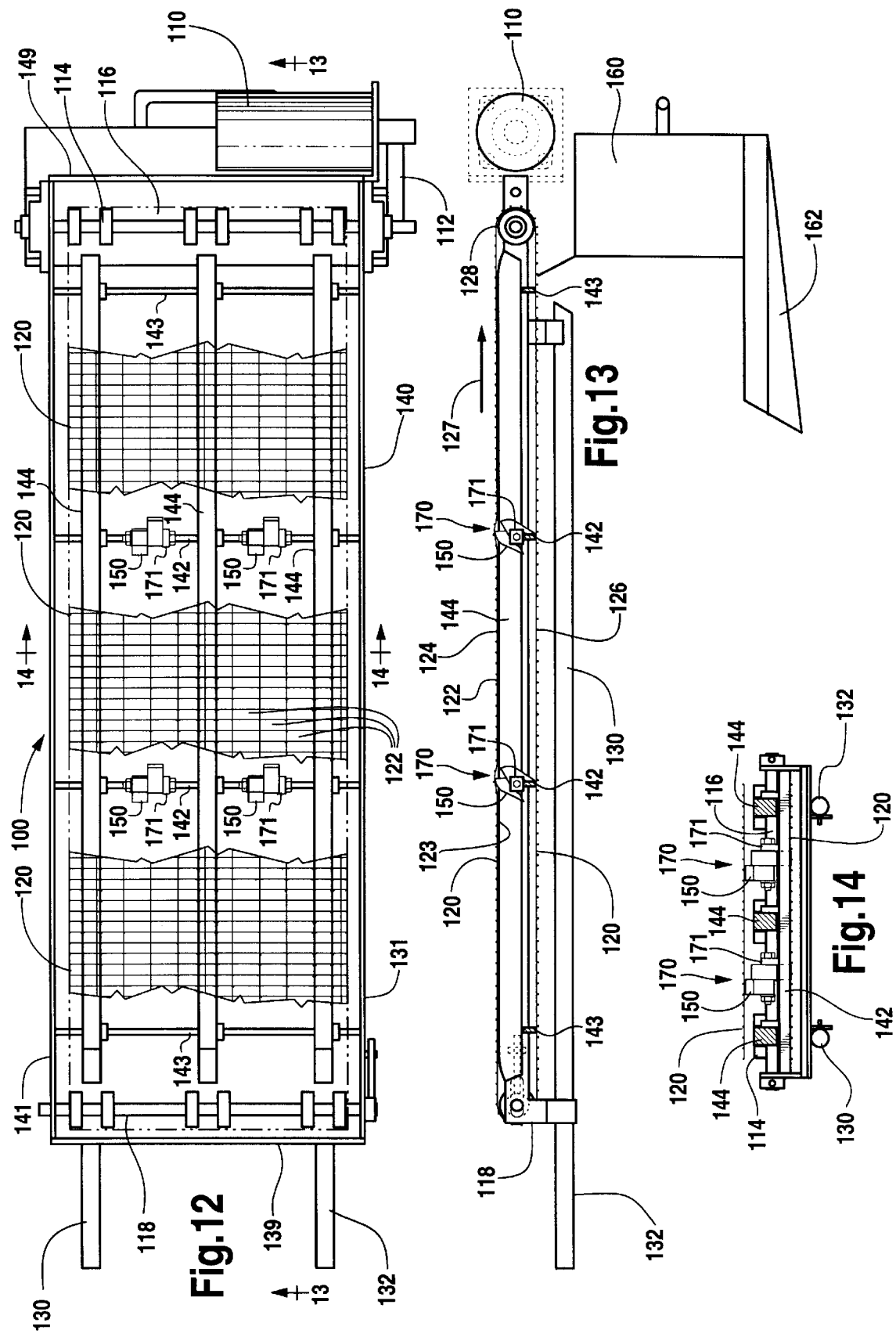

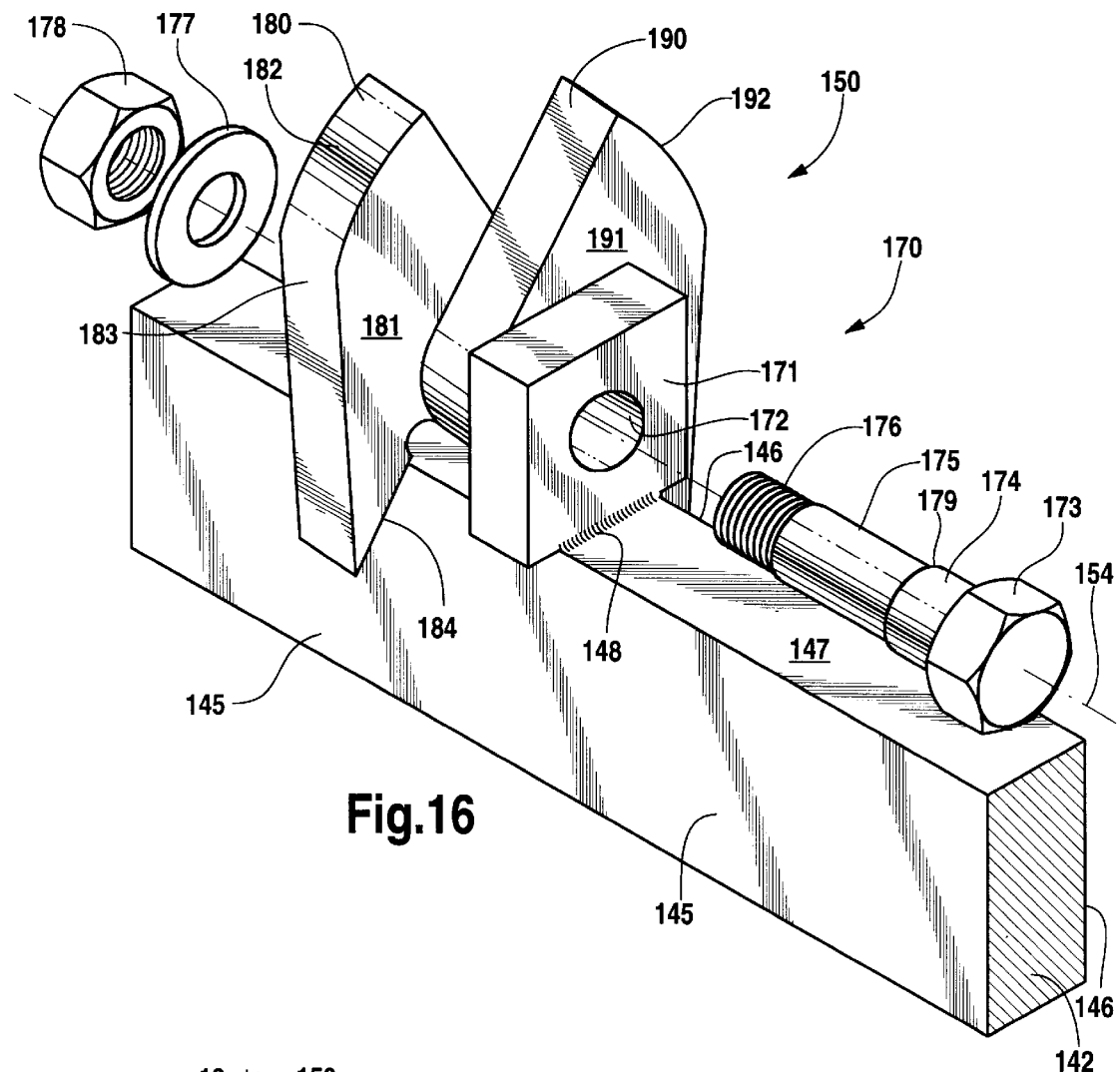
Fig.16
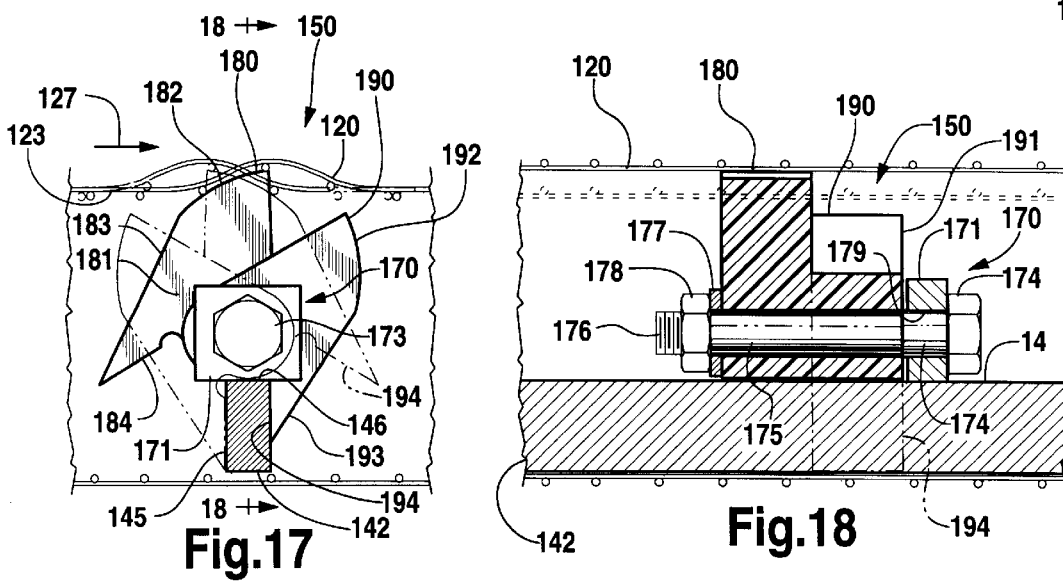
Fig.17
Fig.18

FOOD BREADING APPARATUS

CROSS-REFERENCE TO RELATED APPLICATIONS

This is a continuation-in-part of prior co-pending U.S. patent application Ser. No. 08/752,209 filed Nov. 19, 1996 now U.S. Pat. No. 5,664,489.

TECHNICAL FIELD OF THE INVENTION

This invention relates generally to food processing devices and, more particularly, to an apparatus for breading food products.

BACKGROUND OF THE INVENTION

Pre-prepared food products are much in demand by today's consumers. Food products that are pre-cooked and only require final heating before consumption are desired by both household consumers and commercial food establishments. Fried and oven baked foods especially those having a breaded coating are especially popular in the category of pre-prepared products.

Breaded food products were traditionally prepared individually by hand rolling the food product, for example a chicken breast, in a breading preparation. The breading preparation may be wheat flour or corn meal and spices. After the breading is applied, the food product is typically fried or baked.

Anyone who has breaded food products by hand can understand the time consuming and messy nature of the breading process. Prior attempts at mechanical breading apparatus have been largely unsuccessful. Prior art mechanical systems have incorporated drive systems and hydraulics in and around food containing components, thereby subjecting the food products to potential contamination. Additionally, prior art mechanical breading devices have been largely unsuccessful at removing lumps from the breading mixture. As the lumps are recirculated they continue to grow in size and ultimately pass with the breaded product to further food processing stations. If additional resources are not expended in subsequent sorting operations, the lumps of breading will be packaged with the final breaded product and delivered to the customer. Therefore, there exists a need for a quick, efficient and sanitary food breading apparatus capable of removing lumps of breading mixture.

Prior art food breading apparatus do not include a lump removal conveyor for removing lumps in the breading mixture prior to recirculation of the breading mixture. If the lumps are not removed they grow in size during successive recirculation and ultimately pass with the breaded product to further processing stations generating additional waste.

Prior art food breading apparatuses do not include, in a lump removal conveyor, a shaking device to facilitate breaking up loosely coagulated clumps of breading mixture and to shake free any powdered breading mixture only loosely stuck to the exterior of lumps so that increased recycling of usable powdered breading mixture is achieved.

Prior art food breading apparatus also do not include a metering hopper. The metering hopper contributes to the improved quality and consistency of the breaded product by greatly reducing wide swings in moisture content of the breading mixture, thereby allowing consistent adhesion of the breading to the product and providing an even breading coverage and thickness.

SUMMARY OF THE INVENTION

In accordance with the present invention, a food breading apparatus for breading food components with a breading mixture includes a breading drum rotatable about its longitudinal axis. A drum cradle supports the breading drum. The drum cradle is pivotally mounted to allow for adjustment of the inclination angle of the longitudinal axis of the breading drum from horizontal.

The drum includes an inlet opening located in an upper end, an outlet opening located in a lower end, and a plurality of perforations located proximal to the lower end of a sidewall. The openings are sized to allow surplus breading mixture and lumps of breading mixture to pass therethrough while retaining the breaded food product in the rotating breading drum.

An inlet conveyor directs food components to be breaded into the inlet opening of the breading drum. A recirculating breading mixture conveyor provides the breading mixture to the inlet opening. A takeout conveyor directs breaded food components away from the outlet opening of the breading drum.

A lump removal conveyor is positioned below the perforations in the sidewall of the breading drum. The lump removal conveyor includes a conveyor belt or a conveyor screen having a plurality of openings sized to allow passage of surplus breading mixture therethrough while retaining the lumps of breading mixture for transport to a catch pan for disposition. The lump removal conveyor belt or conveyor screen is flexible and passes along a path between rollers. Additionally, the flexible lump removal conveyor belt or screen is lifted and dropped by shaker shoes so that powdered breading and breading that is loosely adhered to the lumps is dislodged. This facilitates passage of the powdered breading through the openings in the conveyor belt or screen.

A surge hopper and conveyor positioned below the lump removal conveyor collects surplus breading mixture passing through the openings in the lump removal conveyor and transports surplus breading mixture to the recirculation conveyor. A metering hopper is mounted on the surge hopper. The metering hopper stores and dispenses non-recycled breading mixture into the surge hopper at a predetermined rate sufficient to equate to the rate breading mixture is leaving the breading apparatus on the breaded products and as removed lumps. The mixed non-recirculated and recirculated breading mixture passes into the recirculation conveyor wherein the cycle heretofore described begins again.

According to one aspect thereto, the present invention is superior to the prior art systems in that the drive motors and hydraulic systems are remotely located away from the food products, thereby avoiding potential contamination of the food products. Additionally, the breading drum, the lump removal conveyor, the input conveyor, the output conveyor, the recirculation conveyor and surge hopper are all independently driven. Such independent drivers provide versatility for operation of the various breading apparatus components.

According to another aspect of the present invention, a frame supporting the lump removal conveyor has a cross bar to which a shaker shoe assembly is attached. The shaker shoe assembly is positioned between the upper belt portion and the lower return belt portion so that it is below the bottom surface of the upper belt portion. The assembly includes a shaker shoe attached through a pivot bolt so that it pivots into sliding contact to raise the conveyor belt at a point of contact above the normal upper belt path.

According to another aspect of the invention, at least two shaker shoe assemblies are attached to a lateral cross bar of the lump removal conveyor frame so that two points of contact raising the upper belt portion cause the upper belt portion to be raised along a line laterally across the conveyor belt.

According to another aspect of the invention, a plurality of pairs of shaker shoe assemblies are attached to a plurality of cross bars so that the conveyor belt is raised along lines at multiple locations thereby facilitating additional shaking of breading mixture through holes in the flexible lump removal conveyor belt.

According to another aspect of the invention, each shaker shoe assembly includes a reversible direction shaker shoe having a first lobe for raising the upper portion of the flexible conveyor belt, moving in a forward direction, and having a second lobe angularly spaced from said first lobe which is pivoted into contact with the upper portion of the conveyor belt when the belt is moved in a reverse direction. The first lobe has a first curved slide contact surface and the second lobe has a second curved slide contact surface. First and second stop tabs pivot with the lobes of the shaker shoe to contact the cross bar and maintain each respective first or second lobe in sliding contact with the conveyor belt when the belt moves in forward or reverse directions, respectively. The first curved surface of the first lobe is in contact with the conveyor belt when the first stop tab is against a stop surface on the cross bar so that sliding contact is maintained when the conveyor is moving in a forward direction. The second lobe is affixed to the first lobe and pivots out of contact with the conveyor belt as the first lobe pivots into contact with the conveyor belt when the conveyor belt moves in the forward direction. When the conveyor belt is moved in a reverse direction, either intentionally or inadvertently, the first lobe pivots out of contact with the conveyor belt and the curved surface of the second lobe pivots into sliding contact with the bottom of the upper portion of the conveyor belt. The second stop tab engages against a stop surface on the cross bar, so that the second curved surface is maintained in sliding contact with the conveyor belt, thereby raising it from its substantially horizontal path in a reverse direction.

According to another aspect of the invention, the lump removal conveyor belt comprises a flexible screen providing a multiplicity of holes of predetermined size for allowing breading mixture to pass therethrough and for preventing lumps of a greater size from passing therethrough.

According to another aspect of the invention, a pivot boss is attached to the cross bar and the shaker shoe is pivotably attached to the pivot boss through a shoulder bolt. The shaker shoe is securely affixed to the shoulder bolt, yet the shoulder bolt pivots about a fixed axis within the pivot boss without binding.

BRIEF DESCRIPTION OF THE DRAWINGS

The foregoing objects, advantages, and features, as well as other objects and advantages, will become more apparent with reference to the description and drawings below, in which like numerals represent like elements and in which:

FIG. 3 is an end section view of the food breading apparatus of FIG. 1 taken at section line 3—3;

FIG. 4 is an end view of the food breading apparatus of FIG. 1;

FIG. 5 is a partial side view illustrating a breading mixture, metering hopper and a breading mixture surge hopper of the present invention;

FIG. 6 is a partial top section view of the breading mixture metering hopper and the breading mixture surge hopper taken at section line 6—6 of FIG. 5;

FIG. 7 is a partial top view of a breading drum with a partial cutaway portion showing the construction of the interior of the breading drum of the present invention;

FIG. 8 is a partial end section view of the food breading drum of the present invention taken at section line 8—8 of FIG. 7;

FIG. 9 is a partial top view of one embodiment of a lump removal conveyor of the present invention;

FIG. 10 is a partial side view of one embodiment of the lump removal conveyor of FIG. 9;

FIG. 11 is a partial end section view of one embodiment the lump removal conveyor of the present invention taken at section line 11—11 of FIG. 9;

FIG. 12 is a partial top view of an alternative preferred embodiment of a lump removal conveyor of the present invention;

FIG. 13 is a partial side view of an alternative preferred embodiment of the lump removal conveyor of FIG. 12;

FIG. 14 is a partial end section view of an alternative preferred embodiment the lump removal conveyor of the present invention taken at section line 11—11 of FIG. 12;

FIG. 16 is a perspective assembly view of a shaker shoe assembly;

FIG. 17 is an end view of the shaker shoe assembly of FIG. 16; and

FIG. 18 is a partial section view of the shaker shoe assembly of FIG. 17 taken at section line 18—18.

DETAILED DESCRIPTION OF THE PREFERRED EMBODIMENTS

Figure 1:
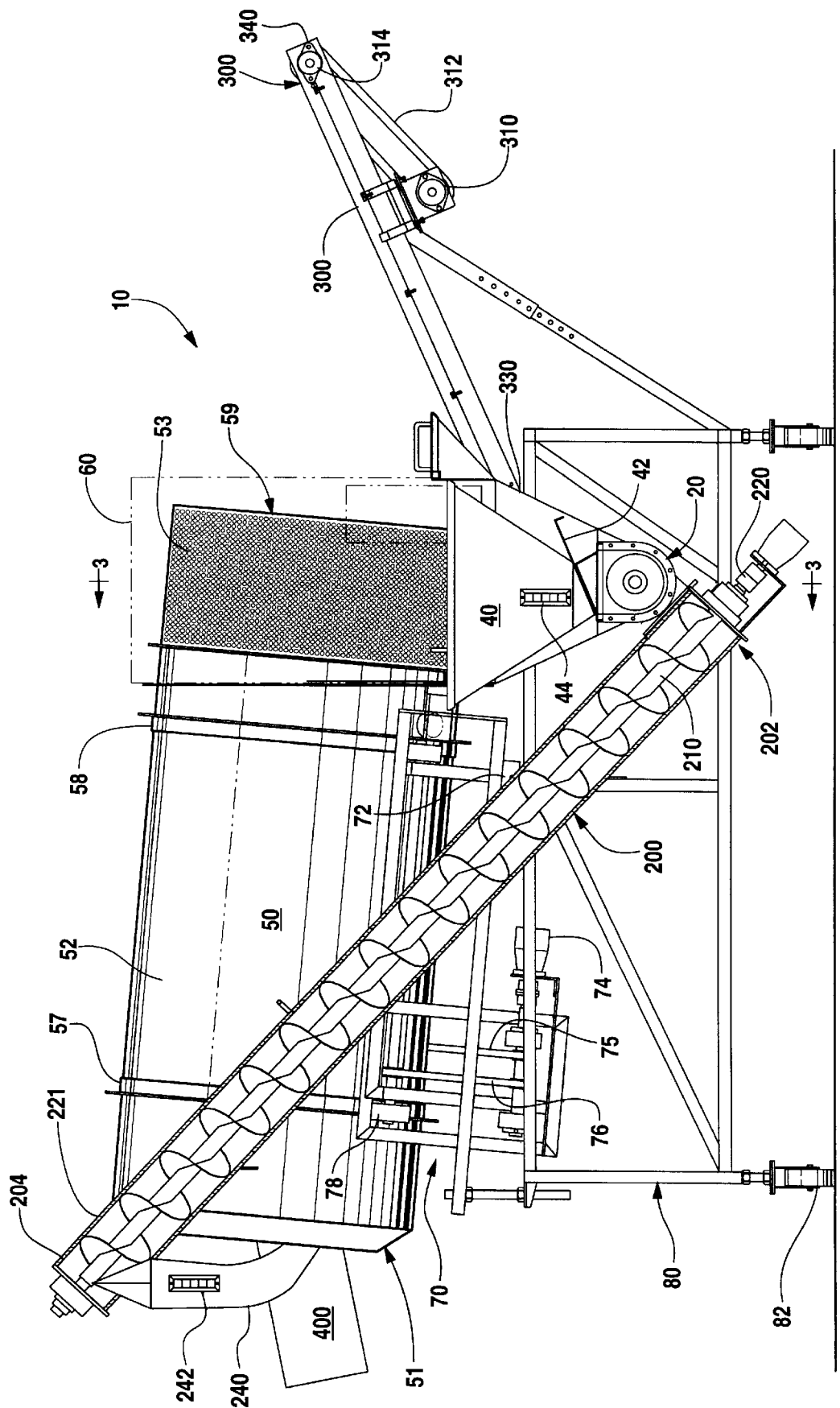
FIG. 1 is a side view of the food breading apparatus of the present invention.
Figure 2:
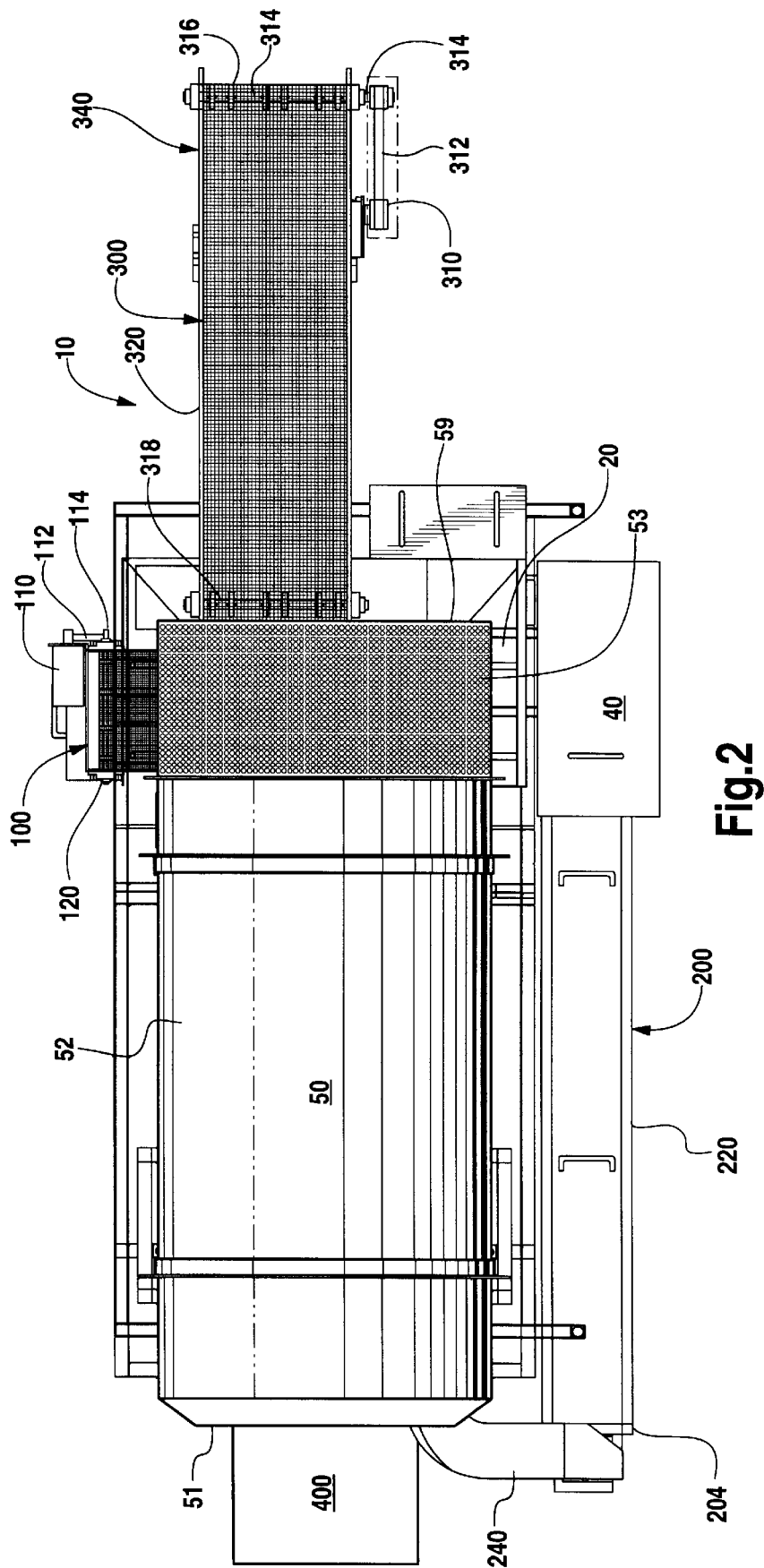
FIG. 2 is a top view of the food breading apparatus of FIG. 1.

Reference is now made to the Drawings wherein like reference characters denote like or similar parts throughout the Figures. Referring to FIGS. 1 and 2, therein is illustrated a food breading apparatus 10. The major components of the food breading apparatus include a breading mixture surge hopper 20, a breading mixture metering hopper 40, a breading drum 50, a containment shroud 60, a drum cradle assembly 70, a frame 80, a lump removal conveyor 100, a recirculation screw conveyor 200, an input conveyor 400 and a takeout conveyor 300.

As used herein "breading mixture" is representative of any breading to be applied to the product to be breaded. A breading mixture typically includes a staple ingredient such as wheat flour. corn flour, corn meal, ground bread crumbs, or the like, or any combination of the above. Added to the staple ingredients are spices to impart any number of flavors to the end food product. It is to be understood that the above recitation of staple products and spices is not meant to be limiting but only illustrative of the basic components of a breading mixture.

As used herein "product to be breaded" is representative of any product to be breaded with the breading mixture in the breading apparatus of the present invention. Such products may include meats such as chicken, beef or pork and vegetables such as squash or okra. It is to be understood that the above recitation product is not meant to be limiting but only illustrative of the type of products that may be breaded by the present invention.

Turning now to FIGS. 3, 5 and 6 therein is illustrated in detail the components of the breading mixture metering hopper 40. Breading mixture is stored in the metering hopper 40 and is dispensed through an adjustable sliding gate 42 for initial charging of the food breading apparatus 10 and continuous make up for the breading mixture leaving with the breaded product out the takeout conveyor 300 (FIG. 1) and lumps removed by the lump removal conveyor 100 (FIG. 2). A vibrator 44 is attached to a sidewall of the metering hopper 40 to assist with dispensing the breading mixture.

Returning to FIG. 1, breading mixture from the metering hopper 40 is received at a lower end 202 of the recirculation conveyor 200 and is delivered by an auger 210 enclosed in a housing 221 to a discharge chute 240 located at an upper end 204 of the recirculation conveyor 200. The auger 210 is driven by an independently controlled motor 220 located at the lower end 202 of the conveyor. The breading mixture is discharged from the upper end of the conveyor and flows down the discharge chute 240 into the breading drum 50. A vibrator 242 located on the discharge chute 240 assists in movement of the breading mixture down the discharge chute 240.

As illustrated in FIGS. 1 and 2, an inlet conveyor 400 delivers product to be breaded to an inlet end 51 of the breading drum 50. The breading mixture has been previously fed into the breading drum 50 from the discharge chute 240. The breading drum 50 is generally 36 inches to 42 inches in diameter and rotates from 3 to 8 revolutions per minute. The speed of rotation is dependent on the desired thickness of the final breaded coating, the nature of the breading mixture and the nature of the product to be breaded. It is noted that liquid is not generally added in the breading drum. The received product to be breaded or other product has enough inherent moisture or retained moisture from prior processing that no additional moisture is needed for adherence of the breading to the product to be breaded. However, it is to be understood that the received product to be breaded or other products could be dipped or sprayed with a liquid prior to entering the breading drum.

As illustrated in FIGS. 1 and 3, the breading mixture surge hopper 20, the breading drum 50, the containment shroud 60, the drum cradle assembly 70, the frame 80, the lump removal conveyor 100, the recirculation screw conveyor 200, the inlet conveyor 400, the takeout conveyor 300, and associated drive motors are all supported by the apparatus frame 80 having a plurality of rollers 82 that enable the breading apparatus 10 to be moved as a self contained unit.

As can be seen in FIGS. 1 and 3, the food breading apparatus and its component parts are attached together and supported by the apparatus frame. The breading drum 50 is supported by the drum cradle assembly 70. The cradle assembly 70 is pivotally mounted at a first end 72 to the apparatus frame 80. The pivotal mounting allows adjustment of the inclination angle from horizontal of the breading drum central axis. The inclination angle and speed of rotation will determine the dwell time of the product to be breaded in the breading drum 50. The inclination angle and rotation time are empirically determined based on the final desired thickness of the breaded coating and the desired throughput rate of breaded product. The food breading apparatus 10 is capable, with a drum size of 30 inches to 42 inches diameter in normal operating ranges of 3 rpm to 8 rpm, of a throughput of approximately 4,000 to 5,000 pounds of product to be breaded per hour. The cradle assembly 70 further includes an independently driven rotation motor 74 connected by belts 75 and 76 to drive rollers 77 and 78. The drive rollers 77 and 78 contact an exterior sidewall 52 of the breading drum 50 and drive the breading drum 50 by frictional contact. Other prior art drum drive systems may also be used to practice some of the aspects of the invention.

Referring to FIGS. 5 and 6 therein is illustrated the breading mixture surge hopper 20. The surge hopper 20 includes a rectangular, tapered, open topped trough 22. Disposed in the base of the trough is a screw conveyor 26, including an auger 28 and an independent drive motor 24 located at the distal end of the auger 28. Breading mixture falls from the lump removal belt 100 above and is collected in the bottom to the trough 22. The screw conveyor 26 moves the breading mixture to the proximal end of the trough 22 that is positioned below the breading mixture surge hopper 20. A predetermined amount of new breading mixture is fed from the metering hopper 40 above and mixes with the recirculated breading mixture in the trough 22 of the surge hopper 20. The volume of new breading mixture, advantageously, is approximately equal to, and replaces the volume of, the breading mixture leaving as breading on the breaded product removed by the takeout conveyor 300 and also the breading mixture coagulated into lumps, removed by the lump removal conveyor 100 and collected in the catch pan 160.

Referring to FIGS. 1 and 6, the mixed new and recirculated breading mixture falls through an opening 29 in the bottom of the trough 22 into the lower end 202 of the recirculation conveyor 200, wherein the cycle heretofore described begins again.

Returning to FIGS. 1 and 2, therein is illustrated the takeout conveyor 300. An independent motor 310 drives a drive belt 312 that in turn drives a drive shaft 314. Drive sprockets 316 located on the drive shaft 314 in turn drive a continuous belt 320. The continuous belt 320 passes over an idler shaft 318 at the proximal end of the takeout conveyor 300. A take out conveyor frame 340 is pivotally mounted at a proximal end 330 to the apparatus frame 80. The motor 310 and the drive shaft 314 are supported by the distal end of a rectangular takeout conveyor frame 340 and an idler shaft 318 is supported on the proximal end. The takeout conveyor 300 carries the breaded product to either a fryer or oven for cooking or to a packaging station for wrapping breaded products that are to be shipped to consumers who will fry or bake the breaded product themselves.

Referring to FIGS. 7 and 8, therein is illustrated additional details of the breading drum 50. Short rib projections 54 are evenly spaced circumferentially around the interior of the drum 50. Interspaced circumferentially among the short rib projections 54 are finger projections 56 taller than the rib projections. The size and spacing of the rib projections 54 and the finger projections 56 are empirically determined by the size of the primary product to be breaded and a desired tumbling rate inside the breading drum 50. The configuration of rib projections 54, in the form of portions of a corrugated structure 540, include a trough 541 and a first wall 542 meeting at a first corner 543 with a crest 544. The crest 544 also meets at a second corner 545 with a second wall 546 extending downward to another trough 541. The first and second walls 542 and 546 are angled in toward each other at the crests 544 and away from each other at the troughs 541. The structure provides strength and repeats itself continuously around the interior of the breading drum to form the corrugated structure 540. Each trough 541 is substantially flat or corresponds to a slight arc shape having the radius of curvature of the drum 50. Each first wall 542 and second wall 546 are also substantially flat and meet with each crest 544 at relatively sharp radius corners 543 and 545. In one embodiment, the radius at the corners 543 and 545 is about 0.5 inch and the crests, troughs and walls are between about 1.0 and 1.5 inches across the flat portions thereof and extend the length of the drum 50 from the inlet end 51 to the beginning of wall portion 53 where perforations 55 are formed. The crests 544 are also substantially flat. Each crest may have a slight arc that corresponds to the radius of curvature of a cylinder defined by all of the plurality of crests 544 around the interior of the breading drum 50. It has been found that, with a construction according to the present invention, having projections 54 formed by sharp-cornered and flat-walled corrugation structure 540, facilitates efficient lifting and carrying of the product to be breaded and the breading mixture. The product and the breading mixture are lifted further up the inside wall of the breading drum during each revolution of the breading drum. This assists in better mixing and tumbling action allowing a large number and volume of products to be breaded to be raised and tumbled along the breading drum.

Long finger projections 56 are attached in a plurality of troughs 541 in rows along such troughs 541, to further facilitate mixing and complete breading of the products. The troughs 541 selected for supporting the long finger projections 56 are spaced around the drum. In the embodiment shown, the rows of long finger projections 56 are positioned in and along every third trough of the corrugated structure 540. Each long finger projection 56 may be formed from a polymeric material having some flexibility, yet having sufficient rigidity and resilience to return to an upright position and to remain erect. Long fingers made of nitrile and designed for another food processing function are obtainable from a commercial source such as a company named Food Craft and will work in this special application. Each long finger projection 56 is attached at a base 561 to connection sites 562 formed along troughs 541 at regular intervals therealong. A shaft 563 of each finger projection 56 tapers slightly from base 561 to a narrow blunt tip 564 having a smaller crosssectional area than the base 561. This construction provides maximum strength and stability at each of the long fingers. Tumbling of the food products and mixing of the breading mixture is further facilitated with the long finger projections to enhance complete breading.

The product to be breaded and the breading mixture are concurrently inserted into the breading drum 50 at an inlet end 51 and are tumbled therein until exiting at an outlet end 59 as a breaded product that falls onto the takeout conveyor 300. Normally, the inlet end 51 is tilted upward from the outlet end 59 so that food products move generally from the upper inlet end 51 toward the lower outlet end 59 as the food products are lifted, rotated and tumbled in the breading drum 50 as it rotates.

Referring again to FIGS. 7 and 8, a pair of exterior support bands 57 and 58 are located circumferentially around the exterior of sidewall 52 of the breading drum 50 to provide structural support and rigidity. Adjacent to the outlet end 59 of the breading drum 50, a wall portion 53 of sidewall 52 is perforated for the lowermost 1 to 1 and ½ feet. As the product to be breaded is tumbled, some of the breading mixture that initially adhered to the product to be breaded becomes detached. Such detached breading mixture may contain moisture from the product to be breaded and as it is tumbled may coagulate to form lumps. The plurality of perforations 55 in the exit end of the drum are sized to allow the lumps and excess breading mixture not adhering to the product to be breaded to pass through the perforations 55 and fall onto the lump removal conveyor 100 located below the perforations. In the present embodiment of the invention, a wall portion 53 of the sidewall 52 of the breading drum is perforated by drilling a plurality of circular holes therein. It is to be understood that other embodiments may include use of woven screen or grating to form the wall portion 53 of the breading drum and thereby allow the lumps and excess breading mixture to pass therethrough, before breaded products are discharged through outlet end 59.

Recirculating usable breading and removal of unusable lumps of breading is facilitated to a certain extent by the containment shroud 60. As can be seen in FIGS. 1 and 4, the containment shroud 60 is mounted to the upper portion of the breading mixture surge hopper 20 and positioned around the wall portion 53 and the lower outlet end 59 of the breading drum 50 and the lump removal conveyor 100. The containment shroud 60 serves as a housing for containment of lumps and breading mixture that may pass through the perforations in the breading drum 50 other than at the bottom of the drum. The containment shroud 60 contains the lumps and breading mixture and directs the breading mixture and lumps to the underlying lump removal conveyor 100 and the breading mixture surge hopper 20.

Turning now to FIGS. 9, 10 and 11 therein is illustrated one alternative embodiment of the lump removal conveyor 100. An independent motor 110 drives a drive belt 112 that in turn drives a drive shaft 114. Drive sprockets 116 located on the drive shaft 114 in turn drive a lump removal conveyor belt 120. There are openings 122 in lump removal conveyor belt 120. Preferably, a continuous flexible wire mesh screen or belt is used to form the lump removal conveyor belt. The lump removal conveyor belt 120 passes along a path between the drive shaft 114 at the proximal end and an idler shaft 118 at the distal end of the lump removal conveyor 100. The lump removal conveyor frame 140 has a rectangular shape and is adjustably mounted on a pair of support guides 130. The support guides 130 are in turn fixably mounted to the inside of the surge hopper 20. The motor 110 and the drive shaft 114 are supported by the proximal end of the lump removal conveyor frame 140 and the idler shaft 118 is supported on the distal end. Lumps of breading are collected on the wire mesh belt and carried to either end for removal. Whether lump removal is at the proximal end or the distal end depends upon the direction of the belt and the positioning of a catch pan 160.

There are openings 122 in the lump removal conveyor belt 120 of the lump removal conveyor 100, sized smaller than the perforations 55 in the breading drum 50. Breading mixture and lumps pass through the perforations 55 in the breading drum 50 as the breading drum 50 rotates. The breading mixture and lumps fall onto the moving lump removal conveyor belt 120 positioned below the perforated wall portion 53 at outlet end 59 of the breading drum 50. Breading mixture sifts through the openings 122 in the lump removal conveyor belt 120 and falls to the trough 22 and the breading mixture surge hopper 20 below. The lumps too large to pass through the openings 122 are carried by the lump removal conveyor belt 120 to the catch pan 160. In the embodiment depicted, the catch pan 160 is positioned below the proximal end of the lump removal conveyor belt 120. The catch pan 160 is supported by mounting bracket 162 that is mounted to the frame 80. It will be understood that a catch pan could be positioned at the distal end of the lump removal conveyor without departing from important aspects of the invention.

In FIGS. 12, 13 and 14 a preferred alternative embodiment of lump removal conveyor 100 is depicted. The construction of this embodiment is similar to the alternative embodiment of FIGS. 9, 10 and 11, except that there are shaker shoes 150 mounted through shaker shoe assemblies 170 to a plurality of cross bars 142. Additional cross bars 143, with or without shaker shoe assemblies 170 attached thereto, are also provided to rigidify the lump removal conveyor frame 140. Also extending along and below an upper segment 124 of lump removal conveyor belt 120 are a plurality of guide rails 144. The conveyor belt 120 is guided along a generally horizontal portion of the path between the conveyor drive shaft 114 and idler shaft 118 by sliding contact between a bottom surface 123 of the lump removal conveyor belt 120 and the guide rails 144. Upon passing over any of the plurality of shaker shoes 150, the lump removal conveyor belt 120 is raised by sliding contact with the shaker shoe 150. After passing over the shaker shoe assembly, the lump removal conveyor belt 120 drops down to the guide rails 144. Because the lump removal conveyor belt is moving relative to the stationary shaker shoes, any lumps carried by the lump removal conveyor belt are rapidly raised and dropped thereby shaking free any loose breading mixture. This action also facilitates breaking loosely packed lumps into sufficiently small pieces to fall through up openings 122 both at the upper segment 124 and the lower segment 126 of the lump removal conveyor belt 120. Those lumps which cannot be broken by the raising and dropping of the lump removal conveyor belt 120 by the shaker shoes 150 will proceed to the catch pan 160 for lump removal. This construction facilitates maintaining sufficiently small pieces of powdered breading mixture for recycling and for breading the food products. Only those lumps which cannot be broken into sufficiently small reusable powder and only that breading mixture which cannot be shaken loose from the firmly coagulated lumps will be discharged with the lumps into catch pan 160 as unusable. The efficiency of the breading apparatus and process is increased by maximizing the use of the breading mixture while minimizing unwanted large lumps of breading that would otherwise be taken with breaded food products into product containers or into a cooking apparatus.

In FIG. 12, a top plan view of the lump removal conveyor 100 is depicted with the lump removal conveyor belt 120 shown with partial cutaway portions so that details of the construction of the shaker shoes 150 attached in shaker shoe assemblies 170 may be more fully understood. As indicated, lump removal conveyor belt 120 has a plurality of openings 122, which openings have maximum dimensions which are smaller than the perforations 53 of the rotating breading drum 50. The openings 122 are sufficiently small to permit passage of only usable powdered breading mixture. The lump removal conveyor frame 140 has sides 131 and 141 and ends 139 and 149 which are fastened together as with bolts or welding to form a generally rectangular frame. The sides 131 and 141 are parallel to each other and aligned with the path of the lump removal conveyor belt 120. Rigidly affixed between sides 131 and 141 are a plurality of cross bars 142 to which the shaker shoe assemblies 170 are attached. There are also additional cross bars 143 extending across the lump removal conveyor frame perpendicular to the path of the belt 120. The additional cross bars 143 may optionally have additional shaker shoes attached.

As indicated in FIG. 13, the top segment 124 of the lump removal conveyor belt 120 moves in one direction, as indicated by direction arrow 127, over the guide rails 144 and past the cross bars 142 and the additional cross bars 143.

The lump removal conveyor belt reverses direction at drive shaft 114. Lumps carried on the belt will fall off the distal end 128 into catch pan 160. Lump removal conveyor belt 120 returns along a lower segment 126 and starts moving in the direction indicated by direction arrow 127 again at idler shaft 118. Powdered breading mixture continually falls through openings 122 for collection in hopper opening trough 22 of surge hopper 20 (not shown in FIGS. 12, 13 or 14). To facilitate efficient transfer of breading mixture through the openings 122, shaker shoes 150 are mounted to the lump removal conveyor in shaker shoe assemblies 170 for raising lump removal conveyor belt 120 through sliding contact between the moving bottom surface 123 of the upper segment of belt 120 and a first curved slide surface 182 of a shaker shoe 150. The shaker shoe 150 and its first curved slide surface are maintained in a stationary position. Advantageously as indicated, two or more shaker shoes 150 are mounted aligned with each other along each cross bar 142 so that the lump removal conveyor belt 120 is raised along lines defined between the pairs of shaker shoes 150. If only one shaker shoe is used it is preferably centered, and if more shaker shoes are used on each cross bar they are preferably evenly spaced, so that twisting moment is not interposed into the belt. Because the upper segment 124 of belt 120 is moving as it passes over each cross bar and the shaker shoes thereon, the breading carried thereon, including powder and lumps, is either passed through openings 122 or is raised rapidly by a small amount corresponding to the contact with shaker shoes 150 and then dropped again through the openings or onto the belt along the path defined by guide rails 144. It will be understood that additional shaker shoes 150 may be mounted along each cross bar 142 and that additional cross bars may carry additional shaker shoes to facilitate sifting of powdered breading through the openings 122. In the embodiment depicted, two pairs of shaker shoes 150 are shown and the lump removal conveyor belt 120 is a continuous flexible wire mesh belt or screen. Also, additional cross bars 143 at either end of the lump removal conveyor are depicted without shaker shoes. Those skilled in the art will recognize that shaker shoes could be attached to additional cross bars 143, if desired. Advantageously, shaker shoes are not positioned immediately adjacent to the distal end 128 of belt 120 at which the lumps are discharged. This avoids powdered breading being shaken into lump catch pan 160.

Figure 15B:
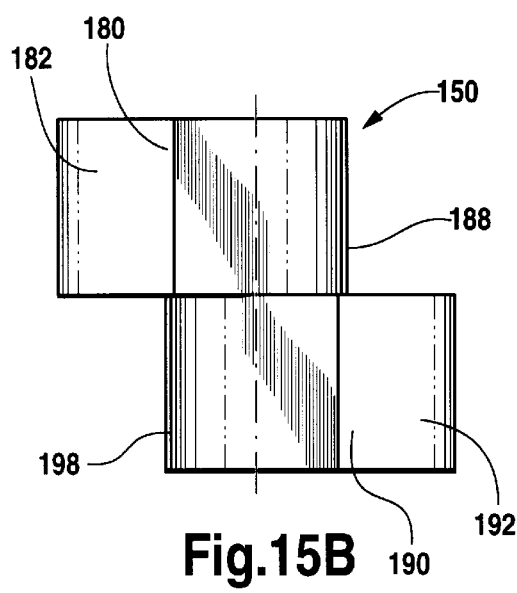
FIG. 15B is a top plan view of the shaker shoe, according to the present invention.
Figure 15A:
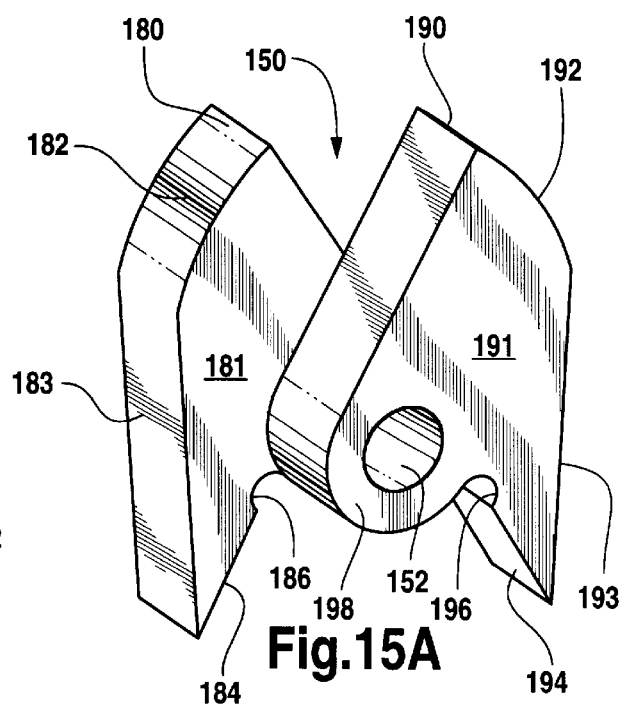
FIG. 15A is a schematic perspective view of a shaker shoe, according to the present invention.
Figure 15C:
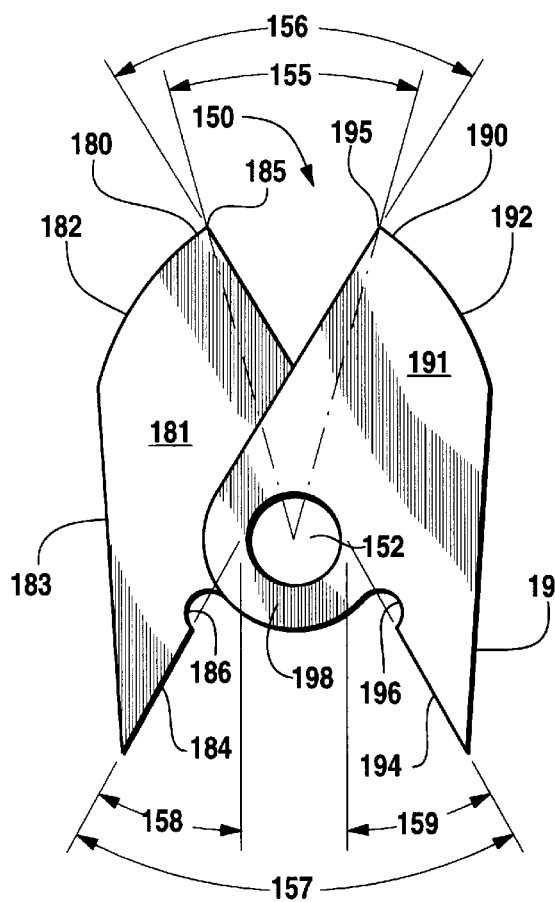
FIG. 15C is a side elevation view of a shaker shoe, according to the present invention.
Figure 15D:
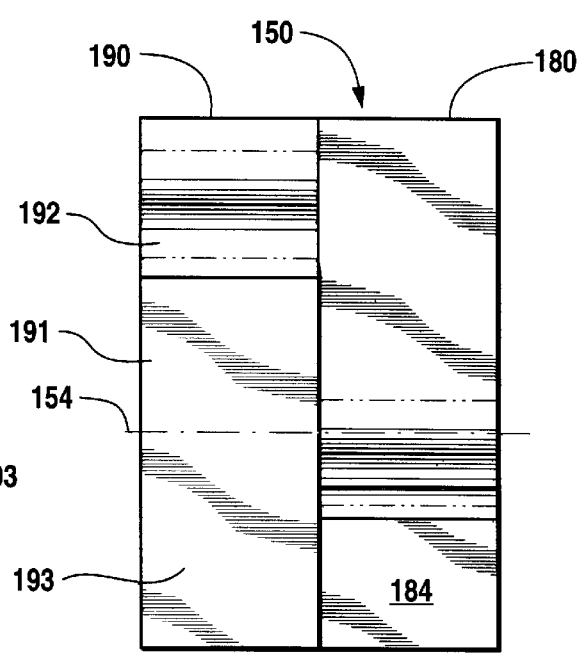
FIG. 15D is a bottom view of a shaker shoe, according to the present invention.

With reference to FIGS. 15A, B, C and D, a desirable shape of a single shaker shoe 150 is depicted. FIG. 15A shows a perspective view, FIG. 15B shows a top view, FIG. 15C shows an end view, and FIG. 15D shows a side view. Each shaker shoe 150, according to the embodiment depicted, includes a forward direction first lobe 180 and a reverse direction second lobe 190. First and second lobes 180 and 190 are rigidly connected together at a base 198 in a solid piece. Preferably, each double-lobed shaker shoe is integrally formed of durable material such as a polymeric material. The material is selected to have a low coefficient of friction for sliding contact with the mesh belt 120. The material is also selected to be acceptable for food processing equipment. A polymer known as Acetal may be used. Preferably, the forward direction first lobe 180 and the reverse direction second lobe 190 have a coaxial mounting hole 152 formed along a pivot axis 154 extending through integrally formed base portions 188 and 198. There is a forward direction first curved slide surface 182 on first lobe 180 and a reverse direction second curved slide surface 192 on second lobe 190. Both curved slide surfaces are formed having a predetermined width parallel to the pivot axis 154.

The particular form of the preferred embodiment, as shown in FIG. 15C, has first and second apexes 185 and 195, respectively, formed spaced apart from each other at an angle 155 of approximately 30 degrees, measured about axis 152 and has first and second curved slide surfaces 182 and 192, respectively, extending about 30 degrees in each direction from the respective first and second apexes. A lobe face angle 156 measures approximately 60 degrees. There are second and first stop tabs 184 and 194, respectively, spaced apart at a tab face angle 157 of approximately 60 degrees. Movement angles 158 and 159 measure a total of about 60 degrees. The first and second stop tabs 194 and 184, respectively, are located approximately 180 degrees from their respective first and second apexes 185 and 195. It will be noted that the first stop tab 194 is formed on the base portion 198 of second lobe 190, and the second stop tab 184 is formed on the base portion 188 of first lobe 180.

With reference to FIG. 16, an assembly view of a shaker shoe 150 in a shaker shoe assembly 170 are shown in position for connection to a portion of cross bar 142. The shaker shoe assembly 170 includes a pivot boss 171 which is rigidly secured to cross bar 142 as by welding at 148. Pivot boss 171 is secured to the top surface 147 of cross bar 142. Pivot boss 171 has a journal opening 172 formed therein. Journal opening 172 is positioned with its pivot axis 154 parallel to cross bar 142 and therefore perpendicular to the lump removal conveyor belt 120. A shoulder bolt 173 is used to pivotably mount shaker shoe 150 to pivot boss 171. The shoulder bolt 173 includes a bearing portion 174, a shaft portion 175 and threads 176. The bearing portion 174 is sized for slip fit pivotable engagement with journal opening 172. The mounting hole 152 of shaker shoe 150 and shaft portion 175 of shoulder bolt 173 are sized smaller than bearing portion 174 and journal opening 172. Bearing portion 174 extends from the head of bolt 173 to a shoulder 179 and, upon insertion into journal opening 172, is longer than boss 171 is wide and extends slightly beyond the pivot boss 171 so that it contacts against a side surface 191 of shaker shoe 150. Thus, shoulder 179 abuts against side surface 191 of shaker shoe 150 leaving clearance between side surface 191 and pivot boss 171. Threads 176 are engaged with a nut 178. A washer 177 may also be used.

FIG. 17 is an end view of the shaker shoe 150 attached to the cross bar 142 with shaker shoe assembly 170, according to the invention. It can be observed that when belt 120 is moving in the direction indicated by direction arrow 127, shaker shoe 150 will pivot in a clockwise direction to a forward position so that first curved slide surface 182 is in contact with the bottom surface 123 of belt 120. Upon movement of the belt 120 in the reverse direction, shaker shoe 150 will pivot in a counterclockwise direction to a reverse position as indicated in phantom lines so that second curved slide surface 192 of the second shoe lobe 190 is in sliding contact with bottom surface 123 of belt 120. In the forward direction, as depicted in FIG. 17, a first stop tab 194 contacts against a first stop surface 146, which is conveniently formed as one side of cross bar 142, to maintain first curved slide surface 182 in sliding contact with belt 120. In the reverse direction, second stop tab 184 will contact against second stop surface 145, which is conveniently formed as an opposed side surface of cross bar 142, so that second curved slide surface 192 is maintained in sliding contact with the belt 120 when it moves in a reverse direction. Those skilled in the art will recognize that this construction allows the direction of movement of lump removal belt 120 in a forward or in a reversed direction without damaging the belt. Forward sliding friction normally moves the forward first curved slide surface 182 into sliding contact with belt 120, and second lobe 190 pivots out of the way. Reverse sliding contact automatically pivots first lobe 180 down out of the way, and second curved slide surface 192 automatically pivots into sliding contact with belt 120. This feature of the invention facilitates conducting repair work or maintenance activities which may require the belt to be alternatingly moved in forward and reverse directions. In certain situations or in particular facilities it may be beneficial to position the catch pan 160 at the opposite end of the lump removal conveyor belt 120. According to this reversible direction feature, either situation may be accommodated conveniently without changing the position of shaker shoes 150 for different direction operation. This also avoids inadvertent gouging of the belt as might otherwise occur from a sharp-cornered surface of the shaker shoe 150 contacting belt 120.

With reference to the partial cross section depicted in FIG. 18, it will be apparent to those skilled in the art that the use of a shoulder bolt 173 effectively permits the shaker shoe 150 to pivot without binding between side surface 191 and pivot boss 171. Thus, the nut 178 can be adequately tightened to prevent loosening and to securely hold shaker shoe 150 in place during operation.

Returning to the shaker shoe construction as depicted in FIGS. 15A through 15D the various features will be described. The forward direction first lobe 180 includes the first curved slide surface 182 having a predetermined width parallel to the path of belt 120. First curved slide surface 182 terminates at one end in a first peak or a first apex 185 and smoothly curves tangentially into a first flat surface 183. Flat surface 183 intersects at an angle with second stop tab 184. Second stop tab 184 has a stress relief radius 186 interposed between it and a first base portion 188. Pivot mounting hole 152 is formed in and through first and second base portions 188 and 198 along an axis 154 parallel to the path of belt 120. The reverse direction second lobe 190 includes a second curved slide surface 192 which terminates at a second upper peak or a second apex 195 and smoothly curves tangentially into a second flat surface 193 downward from the second curved slide surface 192. Second flat surface 193 intersects at an angle with a first stop tab 194. First stop tab 194 intersects with second base portion 198 at a second stress relief radius 196. This construction advantageously provides a lightweight pivotable, but non-rotatable, shaker shoe 150 which has forward direction and reverse direction capabilities. The mechanism is simple, has a durable pivot structure and does not require additional structure and complexity as might be required for a rotational shaker element or for a reciprocating shaker element as might otherwise be required to shake the lump removal conveyor belt.

With reference to the schematic perspective assembly view of FIG. 16, the side view of FIG. 17, and the cross section view of FIG. 18, the details of the construction of the shaker shoe assembly 170 may be more fully understood.

The shaker shoe assembly 170 includes a shaker shoe 150 having a first lobe 180 with a first curved slide surface 182 thereon pivotable into sliding contact with the lump removal conveyor belt for lifting the lump removal conveyor at a point of sliding contact, upward from the substantially horizontal path when the conveyor belt moves in a first direction, so that breading mixture carried thereon is lifted and dropped and thereby shaken to facilitate the passage of powdered breading through the plurality of openings in the lump removal conveyor belt. The shaker shoe 150 also preferably has a second lobe 190 with a second curved slide surface 192 angularly spaced relative to the first curved slide surface 182 for lifting the lump removal conveyor belt at a point of sliding contact upward from the substantially horizontal path when the conveyor moves in a second direction, reverse from the first direction. The shaker shoe assembly 170 further includes a pivot mounting bolt 173 attached to the cross bar 142 and thereby to the lump removal conveyor frame 140 so that the shaker shoe may be mounted thereto and may pivot thereon. The base portion of the shaker shoe 150 is attached through the mounting bolt for pivoting relative to the lump removal conveyor frame. The first lobe 180 of the shaker shoe 150 is connected to or formed on the base for pivoting into and out of sliding contact with the lump removal conveyor belt 120. A first stop surface 146 is attached to the lump removal conveyor frame and may be formed with a side surface of the cross bar 142. A first stop tab 194 is attached to a base portion 198 of the second lobe 190 of shaker shoe 150 at an angular position for contacting the first stop surface 146, when the first curved slide surface 182 is in sliding contact with the lump removal conveyor belt for lifting it. When the first stop tab 194 is in abutting contact with the first stop surface 146, first curved slide surface 182 of first lobe 180 is maintained in sliding contact with lump removal conveyor belt 120, when the lump removal conveyor moves in a first forward direction. First base portion 188 is, preferably, integrally formed with second base portion 198, and both first and second lobes 180 and 190 are thereby mounted for pivoting into and out of sliding contact with the lump removal conveyor belt 120. The second lobe 190 has a second curved slide surface 192. The second stop tab 184 is formed attached to the first lobe 180 and a second stop surface 145 is attached to the lump removal conveyor frame 140. Second stop surface 145 is conveniently formed of another side of the cross bar 142. The first stop tab 194 and the second stop tab 184 are attached to the integrally formed base at angularly spaced apart positions so that the first stop tab 194 contacts the first stop surface 146 when the first lobe 180 is in sliding contact for lifting the lump removal conveyor belt 120, and so that sliding contact is maintained when the conveyor moves in a first direction. The second stop tab 184 contacts the second stop surface 145 when the second lobe 190 is in sliding contact for lifting the lump removal conveyor belt 120, so that sliding contact is maintained when the conveyor moves in a second direction reversed from the first direction.

Preferably, the first and second curved slide surfaces 182 and 192 of the first and second lobes 180 and 190 also respectively include first and second apexes 185 and 195 spaced apart from each other about the pivot axis 154 at an angle of more than about 30 degrees. The first and second stop surfaces are preferably formed as opposite parallel sides of cross bar 142, and the first stop tab 194 is angularly positioned at less than about 180 degrees about the pivot axis 154 from the apex 185 of the first curved slide surface 182. The second stop tab 184 is preferably angularly positioned at less than about 180 degrees about the pivot axis 154 from the apex 195 of the second curved slide surface 192. Thus, the first and second stop tabs have a combined movement angle of approximately 60 degrees so that the shaker shoe 150 may pivot approximately 60 degrees about the pivot axis and the first stop tab 194 contacts the first stop surface 146 when the first curved slide surface 182 liftingly contacts the lump removal conveyor. When pivoted in the counterclockwise direction, the second stop tab 184 contacts the second stop surface 145 when the second curved surface 192 liftingly contacts the lump removal conveyor, as shown in phantom lines in FIG. 17.

With reference to FIG. 18, the non-binding assembly of the shaker shoe 150 onto the shoulder bolt 173 may be more fully understood. Shaker shoe side surface 191 contacts shoulder 179 when nut 178 is threaded onto threads 176 of bolt 173. Thus, the shaker shoe 150 is rigidly engaged on shaft portion 175 of shoulder bolt 173 and shoulder bolt 173 pivots on bearing portion 174 within the pivot boss 171.

It is important to note that the lump removal conveyor 100, working in cooperation with the perforated portion 53 and the outlet end 59 of breading drum 50, is an important feature of the present invention. If lumps are not removed from the recirculated breading mixture by the lump removal conveyor 100, the lumps will continue to grow in size in successive recirculations by coagulation with additional moist breading mixture that has become disengaged from the product to be breaded. If the lumps are not removed before they reach a size that will not pass thorough the perforations 55 in the lower portion 53 of the breading drum 50, they will pass with the breaded product out the outlet end 59 of the breading drum 50 onto the takeout conveyor 300 and will be transported to the fryer, oven, additional processing station, or wrapping station. It is obviously undesirable for lumps of breading to be sold to the consumer with the breaded product.

It is also important to note that the metering hopper contributes to the improved quality and consistency of the breaded product by greatly reducing wide swings in moisture content of the breading mixture, thereby allowing consistent adhesion of the breading to the product and providing an even breading coverage and thickness. In the prior art, two bags of breading mixture, approximately 100 pounds, was added at one time to the prior art breading apparatus. The breading mixture was recirculated until additional breading mixture was required. Another 100 pounds of breading mixture was then added. This prior art method of operation created one-hundred pound surge cycles. The prior art surge cycle manner of operation created breading moisture ranges from dry to sticky clumps, creating non uniform breaded product during each one-hundred pound surge cycle. The metering hopper continuously adds new breading mixture at a rate determined to maintain a substantially constant quantity of breading mixture without surge cycles.

Although the preferred and alternative embodiments of the invention have been illustrated in the accompanying Drawings and described in the foregoing Detailed Description, it will be understood that the invention is not limited to the embodiment disclosed but is capable of numerous modifications without departing from the scope of the invention as claimed.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A food breading apparatus comprising:
    a) a support frame;
    b) a breading mixture recirculating conveyor connected to said support frame;
    c) a rotatable breading drum having a food inlet for receiving food to be breaded and for receiving breading mixture from said recirculating conveyor, a side wall portion with perforations sized for discharging breading and not discharging food therethrough, a food outlet for discharging breaded food from said drum, said rotatable breading drum operatively connected for rotation relative to said support frame;

d) a breading lump removal conveyor operatively connected to said support structure for movement along a substantially horizontal path, said conveyor positioned below said perforations of said breading drum side wall portion for receiving discharged breading from said perforations, and having a plurality of openings of predetermined size for passing powdered breading therethrough and for preventing passage of lumps of breading, said lump removal conveyor further comprising a shaker shoe assembly positioned at least partially in the path of said conveyor for raising a portion of said conveyor as it passes over said shaker shoe assembly so that loose lumps and breading are lifted and dropped to dislodge powdered breading and so that only tightly coagulated lumps are carried by said lump removal conveyor for collection and removal; and e) a surge hopper operatively positioned for receiving said powdered breading from said plurality of openings of said lump removal conveyor, and operatively connected for moving said powdered breading to said breading mixture recirculating conveyor so that said powdered breading is recirculated to said inlet opening of said rotatable breading drum.

2. A food breading apparatus as in claim 1 wherein said shaker shoe assembly of said lump removal conveyor further comprises a shaker shoe having a first lobe with a first curved slide surface thereon pivotable about a pivot axis into sliding contact with said lump removal conveyor for lifting said lump removal conveyor, at a point of sliding contact, upward from said substantially horizontal path when said conveyor moves in a first direction so that breading mixture carried thereon is shaken to facilitate passage of powdered breading through said plurality of openings in said conveyor.

3. A food breading apparatus as in claim 2 wherein said shaker shoe assembly further comprises a pivot mounting bolt attached to said frame coaxial with said pivot axis, a base of said shaker shoe pivotably mounted to said frame through said pivot mounting bolt and to which base said first lobe of said shaker shoe is connected for pivoting into and out of sliding contact with said lump removal conveyor, a stop surface attached to said frame and a stop tab attached to said base at an angular position from said first curved slide surface for contacting said stop surface when said first curved surface is in sliding contact for lifting said lump removal conveyor, so that sliding contact is maintained when said lump removal conveyor moves in said first direction.

4. A food breading apparatus as in claim 3 wherein said shaker shoe assembly further comprises:

a) a cross bar attached to said frame extending under said lump removal conveyor bottom surface;

b) a pivot mounting boss attached to said cross bar having a circular hole therethrough perpendicular to said movement path of said lump removal conveyor; and c) said pivot bolt comprising a shoulder bolt pivotably inserted through said circular hole in said pivot mounting boss and rigidly secured through said base of said shaker shoe.

5. A food breading apparatus as in claim 2 wherein said shaker shoe assembly further comprises at least two shaker shoes each simultaneously pivotable into sliding contact with said lump removal conveyor at lateral positions for lifting said lump removal conveyor at two points of contact defining a lift line therebetween, laterally across said lump removal conveyor, so that all breading mixture carried by said conveyor past said lift line is raised and dropped to facilitate shaking of loose breading mixture through said conveyor.

6. A food breading apparatus as in claim 2 wherein said shaker shoe assembly further comprises said shaker shoe having a second curved slide surface angularly spaced relative to said first curved slide surface for lifting said lump removal conveyor, at a point of sliding contact, upward from said substantially horizontal path when said conveyor moves in a second direction reversed from said first direction.

7. A food breading apparatus as in claim 6 wherein said shaker shoe assembly further comprises a pivot mounting bolt attached to said frame, a base of said shaker shoe pivotably mounted to said pivot mounting bolt and to which said first lobe and said second lobe are connected for pivoting into and out of sliding contact with said lump removal conveyor, a first stop surface and a second stop surface attached to said frame, and a first stop tab and a second stop tab attached to said base at spaced apart angular positions, so that said first stop tab contacts said first stop surface when said first lobe is in sliding contact for lifting said lump removal conveyor and sliding contact is maintained when said conveyor moves in a first direction and so that said second stop tab contacts said second stop surface when said second lobe is in sliding contact for lifting said lump removal conveyor and sliding contact is maintained when said conveyor moves in said second direction.

8. A food breading apparatus as in claim 7 wherein said first and second curved slide surfaces of said first and second lobes, respectively, comprise first and second apexes spaced apart from each other about the pivot axis at an angle of more than about 30 degrees, said first and second stop surfaces comprise opposite sides of a cross bar, and said first stop tab comprises a first tab surface angularly positioned at less than approximately 180 degrees about said pivot axis from said apex of said first curved slide surface and said second stop tab comprises a second tab surface angularly positioned at less than approximately 180 degrees, about said pivot axis, from said apex of said second curved slide surface so that said first and second stop tabs comprise tabs spaced apart approximately 60 degrees from each other, so that said shaker shoe may pivot approximately 60 degrees about said pivot axis and said first stop tab contacts said first stop surface when said first curved slide surface liftingly contacts said lump removal conveyor and so that said second stop tab contacts said second stop surface when said second curved slide surface liftingly contacts said lump removal conveyor.

9. A food breading apparatus as in claim 1 further comprising:

a) a food input conveyor aligned with said food inlet of said rotatable breading drum for and operatively connected for receiving moist food products and for moving said moist food products for delivery into said food inlet of said rotatable breading drum; and b) a take-out conveyor operatively connected and positioned for receiving breaded food product from said food outlet of said rotatable breading drum.

10. A food breading support apparatus as in claim 1 further comprising a drum cradle coupled between said support frame and said rotatable breading drum and supporting said rotatable breading drum for rotation about a longitudinal axis, said drum cradle pivotable relative to said support frame for adjustment of an inclination angle of said longitudinal axis of said rotatable breading drum so that said food inlet of said rotatable breading drum is relatively higher than a food outlet and so that the rate of movement of food and breading mixture through said rotatable breading drum is adjustable, according to said adjusted inclination angle of said longitudinal axis of said rotatable breading drum.

11. A food breading apparatus as in claim 1 further comprising a metering hopper having a top portion for receiving fresh breading mixture, an adjustable gate between said metering hopper and said surge hoper for adjusting the rate that fresh breading mixture may pass from said metering hopper to said surge hopper, a vibration device attached to said metering hopper for maintaining a continuous flow of fresh breading mixture through said adjustable gate, and a passage from said surge hopper to said breading mixture recirculating conveyor so that fresh breading mixture is recirculated with said powdered breading received into said surge hopper from said plurality of openings of said lump removal conveyor.

12. An improved food breading apparatus of the type having an input end for receiving food to be breaded and for receiving breading mixture and having an outlet end for discharging breaded food and excess breading, the improvement comprising:
   a) breading removal perforations formed adjacent said outlet end of said food breading apparatus and sized for separating excess breading powder and breading lumps from said discharged breaded food;
   b) a continuous lump removal conveyor screen having an upper segment defining a top conveyor surface and a bottom conveyor surface, and having a lower return segment, said top surface of said upper segment positioned for receiving said excess breading powder and lumps from said breading removal perforations, said conveyor screen driven along a path between at least two conveyor rollers, said continuous lump removal conveyor screen having a plurality of openings therein sized smaller than said breading removal perforations for allowing powdered breading to pass therethrough and for preventing lumps of coagulated breading from passing therethrough, said conveyor screen positioned for carrying lumps of coagulated breading for collection;
   c) a shaker shoe mounted along said path of said continuous lump removal conveyor screen for sliding contact with said bottom conveyor surface of said upper segment of said continuous lump removal conveyor screen to raise at least a portion of said conveyor screen as said conveyor screen moves along said path and as said conveyor screen slides over said shaker shoe so that lumps of coagulated breading are lifted and dropped to dislodge loose powdered breading and to shake said breading powder through said plurality of openings; and
   d) a recirculation conveyor operatively attached to said food breading apparatus for receiving powdered breading from said lump removal conveyor and for recirculating said powdered breading to said breading apparatus.

13. A food breading apparatus as in claim 12 further comprising at least two shaker shoes mounted aligned perpendicular to said path of said conveyor screen so that said conveyor screen is raised up along at least one line between said at least two shaker shoes perpendicular across said conveyor screen.

14. A food breading apparatus as in claim 13 further comprising a plurality of pairs of shaker shoes, each pair mounted aligned perpendicular to said path of said conveyor screen and said plurality of pairs spaced along said path of said conveyor screen so that said breading is raised and dropped a plurality of times as said lumps are carried for collection.

15. A food breading apparatus as in claim 12 wherein said shaker shoe comprises:
   a) a pivot mount rigidly affixed below a portion of said conveyor screen;
   b) a first pivot stop surface affixed to said pivot mount;
   c) a first curved sliding surface for smooth sliding contact with said bottom surface of said conveyor screen when said conveyor screen is driven along said path in a first direction; and
   d) a first stop surface formed on said shaker shoe for abutting against said first stop surface on said pivot mount to allow said first curved surface to pivot into contact with said bottom surface of said conveyor belt and to maintain said contact.

16. A food breading apparatus as in claim 15 further comprising:
   a) a second pivot stop surface affixed to said pivot mount;
   b) a second curved sliding surface formed on said shaker shoe oppositely directed from said first curved sliding surface and connected at a predetermined angle relative to said first curved surface for smooth sliding contact between said bottom surface of said conveyor screen and said second curved surface when said conveyor screen is driven along said path in a second direction opposite from said first direction; and
   c) a second stop surface formed on said shaker shoe oppositely directed from said first stop for abutting against said second pivot stop surface affixed to said pivot mount to allow said second curved surface to pivot into sliding contact with said bottom surface of said conveyor screen and to maintain said contact so that only said second curved surface contacts said conveyor screen when it is driven in said second direction opposite from said first direction.

17. A shaker shoe assembly for attachment to a conveyor of the type having a frame with at least one lengthwise member, at least two rollers laterally spaced apart along said lengthwise member to support a continuous mesh belt for movement along at least one upper path between said rollers, said shaker shoe assembly comprising:
   a) at least one cross bar attached to said lengthwise member of said frame extending under said at least one upper path of said mesh belt;
   b) a bolt pivotably attached to said cross bar below and substantially perpendicular to said upper path of said mesh belt; and
   c) at least one shaker shoe comprising:
      i) a base portion secured to said bolt for pivoting about an axis substantially perpendicular to said upper path of said mesh belt;
      ii) a first lobe connected to said base at a first angled position about said axis;
      iii) a second lobe connected to said base at a second angled position about said axis at an acute angle from said first angled position of said first lobe so that said first and second lobes are angularly spaced from each other and so that said first lobe is pivotable into a first raised position above said upper path of said mesh belt for contacting said mesh belt when said second lobe is pivoted into a first lowered position below said upper path of said mesh belt and not contacting said mesh belt and said second lobe is pivotable into a second raised position above said upper path of said mesh belt for contacting said mesh belt when said first lobe is pivoted into a second lowered position below said upper path of said mesh belt and not contacting said mesh belt;

iv) a first stop tab attached to said base portion at a third angled position about said axis for contacting said at least one cross bar and for preventing further rotation, in a forward direction of belt movement, when said first lobe is pivoted into said first raised position for contacting said continuous mesh belt, and v) a second stop tab attached to said base at a fourth angled position for contacting said at least one cross bar and for preventing further rotation, in a reverse direction of belt movement opposite from said forward direction of belt movement, when said second lobe is pivoted into said second raised position for contacting said mesh belt.

18. A shaker shoe assembly as in claim 17 further comprising a second shaker shoe attached through a second bolt to said cross bar spaced perpendicularly from said at least one shaker shoe, so that said at least one of said second shaker shoes slidingly contacts said conveyor simultaneously along a line defined by points of sliding contact thereby raising said conveyor along a line across said continuous mesh belt to shake substantially all of said breading mixture carried thereon.

19. A shaker shoe assembly as in claim 18 wherein said bolt further comprises a shoulder bolt attached to said at least one shaker shoe and to said frame for non-binding pivoting.

* * * * *